United States Patent
Yamakage et al.

(10) Patent No.: US 7,090,933 B2
(45) Date of Patent: Aug. 15, 2006

(54) MAGNETO-OPTICAL RECORDING MEDIUM INCLUDING A SOFT MAGNETIC LAYER, A PROTECTIVE LAYER AND A SILANE COUPLING AGENT LAYER, IN THIS ORDER

(75) Inventors: Yuzuru Yamakage, Kawasaki (JP); Takuya Kamimura, Kawasaki (JP); Ken Tamanoi, Kawasaki (JP); Mineo Moribe, Kawasaki (JP); Keiji Shono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/863,875

(22) Filed: Jun. 8, 2004

(65) Prior Publication Data

US 2004/0224119 A1  Nov. 11, 2004

Related U.S. Application Data

(63) Continuation of application No. PCT/JP01/11417, filed on Dec. 25, 2001.

(51) Int. Cl.
G11B 11/105 (2006.01)

(52) U.S. Cl. .................. 428/820; 369/13.4; 369/13.55

(58) Field of Classification Search ..................... None
See application file for complete search history.

(56) References Cited

U.S. PATENT DOCUMENTS

| | | | | |
|---|---|---|---|---|
| 4,687,712 A | * | 8/1987 | Sugita et al. | 428/611 |
| 5,792,564 A | * | 8/1998 | Hikosaka et al. | 428/610 |
| 6,212,137 B1 | * | 4/2001 | Nakajima | 369/13.35 |
| RE37,428 E | * | 10/2001 | Watanabe et al. | 369/13.17 |

FOREIGN PATENT DOCUMENTS

| | | |
|---|---|---|
| EP | 0424809 A2 * | 5/1991 |
| JP | 61-071437 | 4/1986 |
| JP | 61-113153 | 5/1986 |
| JP | 63-244345 | 10/1988 |
| JP | 3-105741 | 5/1991 |
| JP | 3-137837 | 6/1991 |
| JP | 3-141055 | 6/1991 |
| JP | 5-307780 | 11/1993 |
| JP | 2000-076720 | 3/2000 |
| JP | 2000-200448 | 7/2000 |

* cited by examiner

Primary Examiner—Kevin M. Bernatz
(74) Attorney, Agent, or Firm—Greer, Burns & Crain, Ltd.

(57) ABSTRACT

The invention is a magneto-optical recording medium characterized by containing at least a soft magnetic layer, a protective layer, a resin layer having a servo pattern formed thereon, a reflecting film, a lower dielectric material film, a recording film, an upper dielectric material film, and a cover layer, formed on a substrate in this order.

8 Claims, 14 Drawing Sheets

Schematic Cross Sectional View of Magnetooptical Storage Medium of First Example of the Invention Schematic Cross Sectional View of Magnetooptical Storage Medium of First Example of the Invention Explanatory View of Magnetic Flux Flow in First Example of the Invention Explanatory View showing Relationship of Flying Head and the like in First Example of the Invention Production Process Diagrams of Magnetooptical Recording Medium of First Example of the Invention Production Process Diagrams of Magnetooptical Strage Medium of First Example of the Invention Schematic Cross Sectional View of Magnetooptical Recording Medium
of Second Example of the Invention FIG. 9
Production Process Diagrams of Magnetooptical Strage Medium of Second Example of the Invention
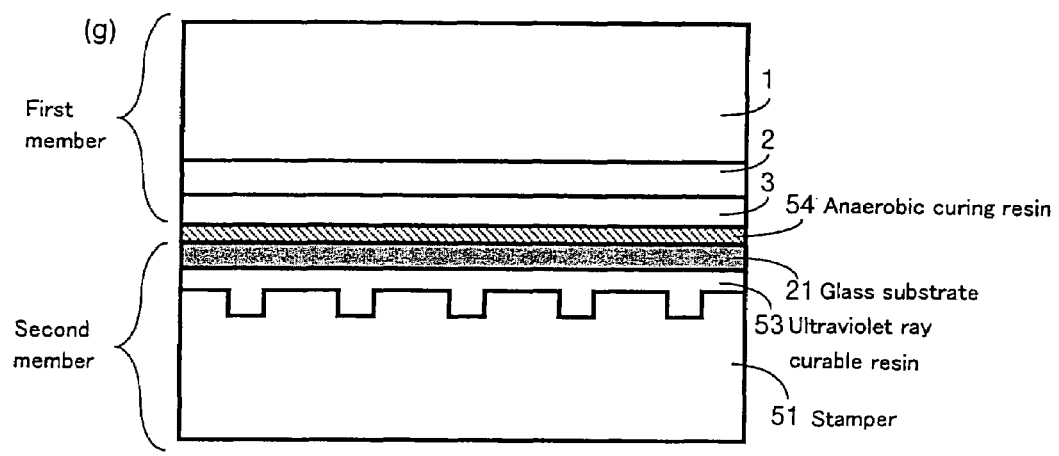
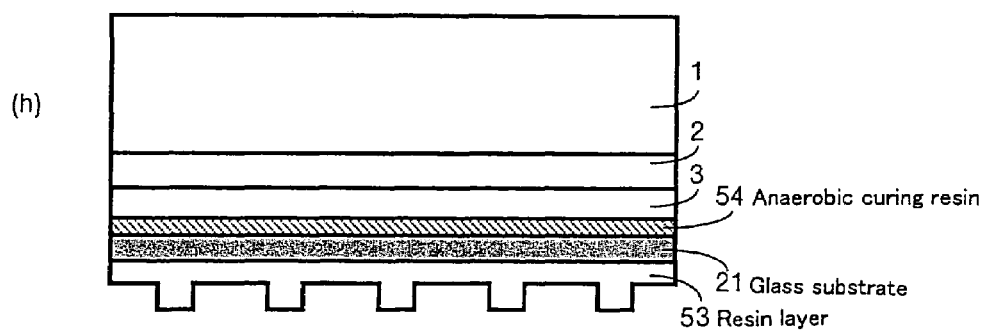

FIG. 10  Production Process Diagrams of Magnetooptical Strage Medium of Second Example of the Invention Explanatory View showing Relationship of Flying Head and the like in Second Example of the Invention FIG. 13
Production Process Diagrams of Magnetooptical Strage Medium of Third Example of the Invention
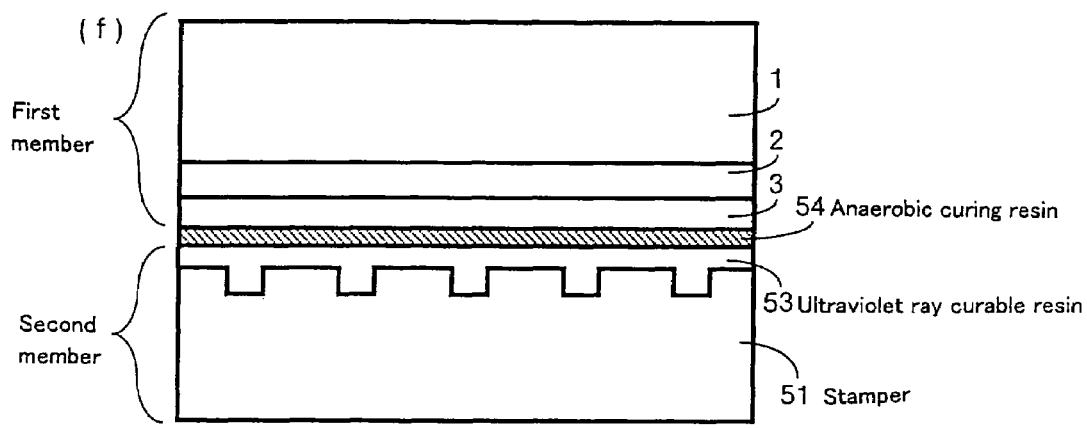
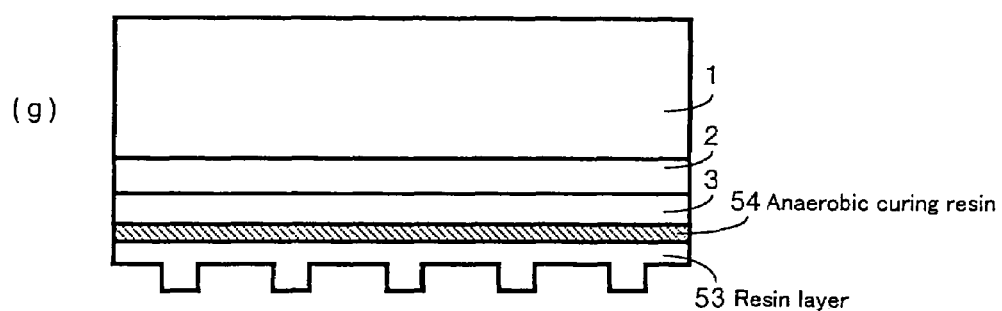

Production Process Diagrams of Magnetooptical Strage Medium of Third Example of the Invention

MAGNETO-OPTICAL RECORDING MEDIUM INCLUDING A SOFT MAGNETIC LAYER, A PROTECTIVE LAYER AND A SILANE COUPLING AGENT LAYER, IN THIS ORDER

This is a continuation of International PCT Application No. PCT/JP01/11417 filed Dec. 25, 2001.

TECHNICAL FIELD

The present invention relates to a magneto-optical recording medium, and more particularly, it relates to a magneto-optical recording medium having a soft magnetic film.

BACKGROUND ART

Many examples of magneto-optical recording media having been practically used are formed by accumulating a recording layer, a protective layer and the like on a transparent substrate, and exert recordation and reproduction of information with light incident on the side of the substrate.

Miniaturization of a track width and a recordation mark size is exemplified as means for increasing the recording density of the magneto-optical recording medium, and for example, reduction of a spot size of a light beam for irradiating the magneto-optical recording medium has been practiced. The numerical aperture NA of an objective lens currently used for the magneto-optical recording medium is about from 0.55 to 0.6.

In general, a relational equation $\phi=\lambda/2NA$ holds, in which $\phi$ represents a spot size, NA represents a numerical aperture of an objective lens, and $\lambda$ represents a wavelength of laser light. According to the equation, in order to decrease the spot size $\phi$, it is necessary to increase the numerical aperture NA of the objective lens. In the case where the NA is increased, the resolving power is improved, but the focal length is shortened.

Therefore, in the case where the numerical aperture NA becomes larger, the aberration due to unevenness of the thickness and tilt of the substrate is increased, and thus, it is necessary to decrease the thickness of the substrate as far as possible. Accordingly, it is preferred for realizing high density recordation that recordation and reproduction are conducted with light incident on the side of the recording film, rather than the conventional recordation and reproduction conducted with light incident on the side of the substrate.

Hereinafter, the system conducting recordation and reproduction with light incident on the side of the recording film is referred to as a front illumination system.

In the front illumination system, an optical flying head having a structure, in which a coil generating a magnetic field and an objective lens are integrated, and a proximity actuator are used.

In a magneto-optical recording medium, to which a high recording magnetic field (for example, 300 Oe or more) is necessarily applied, it is generally necessary that a large electric current (about 900 mA) is applied to the coil of the proximity actuator.

In order to improve the rate of recordation and reproduction, on the other hand, it is necessary that the electric current is switched at a high speed, and thus, a high speed transient response is demanded.

In the case where a large electric current is applied, however, the transient response time of the electric current is necessarily large, and thus, high speed switching of the electric current, i.e., high speed switching of the magnetic field, becomes difficult.

Furthermore, upon conducting high speed switching of the electric current, the electric current flows on the surface layer of the coil, and the resistance of the coil is increased to cause heat generation of the coil, which brings about problems in deterioration of performance, service life and the like.

Therefore, high speed switching of an electric current is difficult in a medium requiring a high recording magnetic field, and in order to realize a recording speed of 100 Mbps, it is necessary to suppress the upper limit of the intensity of the recording magnetic field to about 200 Oe or less. In other words, it is necessary to suppress the electric field intensity for satisfying the demanded specification of 100 Mbps.

In order to maintain the recording performance equivalent to that with an externally applied magnetic field of 300 Oe even though the magnetic field intensity is reduced to 200 Oe, it has been practiced that a soft magnetic layer, such as NiFe and the like, is formed as an underlayer of the recording layer on the substrate.

This is because upon applying a magnetic field to a soft magnetic layer, a magnetization state equivalent to that obtained by applying a high magnetic field owing to such a nature that the magnetic flux is not diffused but is concentrated thereto. Therefore, in the case where a soft magnetic layer is provided, recordation and reproduction of a medium requiring a high recording magnetic field can be conducted with a decreased electric current flowing in a coil.

It is necessary that the thickness of the soft magnetic layer is 100 nm or more for obtaining an effect equivalent to that obtained by applying a high magnetic field of 300 Oe.

A conventional ordinary magneto-optical recording medium has a servo pattern having a concavoconvex shape containing lands and grooves on the surface thereof, and a soft magnetic layer is formed on the servo pattern.

In the case where a soft magnetic layer having a thickness of 100 nm or more is formed, however, the lands are broadened to change the width ratio of the lands and the grooves, the taper angle of the grooves becomes significantly obtuse, the edge parts of the lands and the grooves are notably rounded.

Accordingly, a recording layer is thus formed on the soft magnetic layer, to which the servo pattern of the substrate is not accurately reflected, and therefore, recordation and reproduction cannot be conducted with satisfying the demanded performance.

Japanese Unexamined Patent Publication No. Hei 03-105741 (1991) discloses a substrate for a magneto-optical recording medium improved in C/N by providing a soft magnetic material layer having a thickness of about 100 nm or more on an aluminum substrate, and further providing a groove layer thereon.

However, an aluminum substrate generally has a low rigidity, and there is a possibility that it is in contact with an objective lens upon disposing closely thereto, and thus, a proximity actuator is not preferably used.

Furthermore, in the case where the groove layer is provided directly on the soft magnetic layer, the soft magnetic layer is exposed to the air to bring about such a possibility that the magnetic characteristics are changed due to oxidation and nitriding.

DISCLOSURE OF THE INVENTION

The invention has been developed under consideration of the aforementioned circumstances, and oxidation and nitriding of a soft magnetic layer are prevented by providing a protective layer on the soft magnetic layer to provide a magneto-optical recording medium having stable magnetic characteristics.

The invention provides a magneto-optical recording medium characterized by containing at least a soft magnetic layer, a protective layer, a resin layer having a servo pattern formed thereon, a reflecting film, a lower dielectric material film, a recording film, an upper dielectric material film, and a cover layer, formed on a substrate in this order.

According to the invention, oxidation and nitriding of the soft magnetic layer are prevented to provide a magneto-optical recording medium having stable magnetic characteristics.

It also provides a magneto-optical recording medium characterized by containing a first member containing a soft magnetic film and a protective film formed on a first substrate in this order, and a second member containing a resin layer having a servo pattern formed thereon, a reflecting film, a lower dielectric material film, a recording film, an upper dielectric material film, and a cover layer, formed on a second substrate having light transmissibility, the protective film and the second substrate being adhered through an anaerobic curing resin.

It is preferred from the standpoint of magnetic characteristics in the invention that the soft magnetic film contains FeC, the protective film contains an $SiO_2$ film having a thickness of about 10 nm, and thicknesses of the resin layer, the reflecting film and the lower dielectric material film are adjusted to regulate a distance between the soft magnetic film and the recording film to about 10 µm or less.

It is also possible that thicknesses of the respective constitutional films including from the protective film to the cover layer are adjusted to maintain a distance between the soft magnetic film and a coil for generating a magnetic field provided in a recordation and reproduction head to about 22±4 µm.

The invention further provides a process for producing a magneto-optical recording medium characterized by containing steps of: forming a soft magnetic film on a substrate by a sputtering method; forming a protective film on the soft magnetic film; pressing a member having a thermosetting resin dropped on a stamper having a prescribed servo pattern formed thereon in such a manner that a surface of the thermosetting resin and the protective film are in contact with each other; applying prescribed heat to cure the thermosetting resin, followed by releasing the stamper; forming a reflecting film, a lower dielectric material film, a recording film and an upper dielectric material film, in this order on the thermosetting resin by a sputtering method; and coating an ultraviolet curable resin on the upper dielectric material film to form a cover layer.

The invention still further provides a process for producing a magneto-optical recording medium characterized by containing steps of: producing a first member having a soft magnetic film and a protective film formed on a first substrate in this order by a sputtering method; providing a first member having a resin layer formed thereon by dropping an ultraviolet curable resin on a stamper having a prescribed servo pattern formed thereon, and pressing a second substrate having light transmissibility on the ultraviolet curable resin, followed by irradiating with an ultraviolet ray from above the second substrate to cure the ultraviolet curable resin; dropping an anaerobic curing resin on the second substrate of the second member, followed by combining the protective film of the first member and the second substrate through the anaerobic curing resin; curing the anaerobic curing resin, followed by releasing the stamper; forming a reflecting film, a lower dielectric material film, a recording film and an upper dielectric material film on a surface of the resin layer having the servo pattern formed thereon in this order by a sputtering method; and coating an ultraviolet curable resin on the upper dielectric material film to form a cover layer.

BRIEF DESCRIPTION OF THE DRAWINGS

FIG. 9 is production process diagrams of the magneto-optical recording medium of the second example of the invention.

FIG. 13 is production process diagrams of the magneto-optical recording medium of the third example of the invention.

MODE FOR CARRYING OUT THE INVENTION

The invention will be described below based on embodiments shown in the figures. The invention is not limited to the embodiments.

FIRST EXAMPLE

Figure 1:
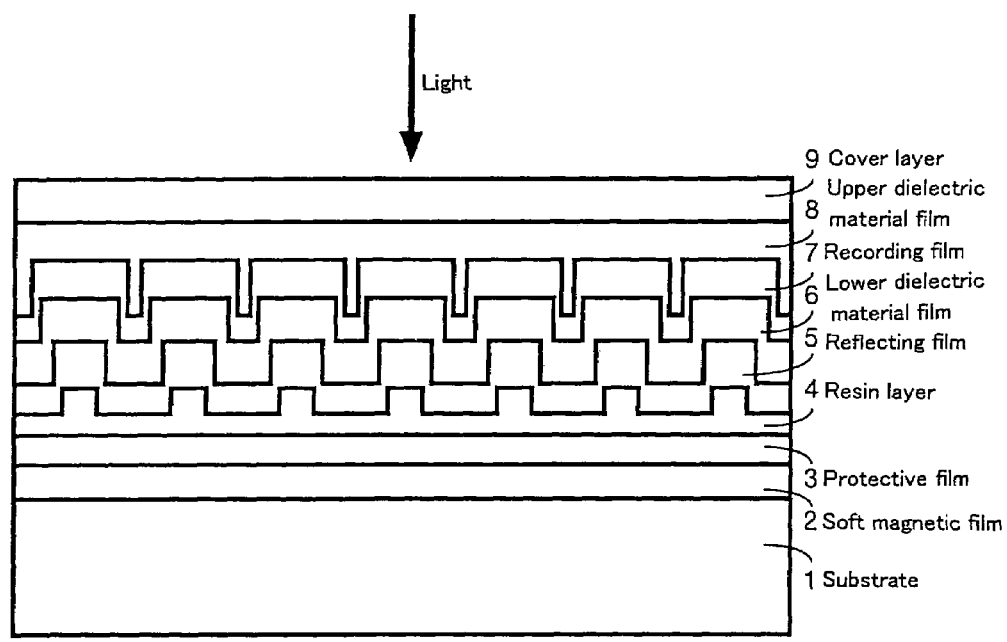
FIG. 1 is a schematic cross sectional view showing a magneto-optical recording medium of a first example of the invention.

FIG. 1 is a schematic cross sectional view showing a magneto-optical recording medium of the first example of the invention.

Constitution of Medium of First Example

The magneto-optical recording medium of the first example has an accumulated structure obtained by forming a soft magnetic film 2, a protective film 3, a resin layer 4, a reflecting film 5, a lower dielectric material film 6, a recording film 7, an upper dielectric material film 8, and a cover layer 9, formed on a substrate 1 in this order.

Glass, silicon and the like, which have a rigidity as high as possible, are used as the substrate 1.

A material having magnetism is used as the soft magnetic film 2 for concentration of magnetic flux, and FeC, FeNi, FeAlSi, CoZrNb and the like can be used.

The protective film 3 is formed with such a material that is capable of preventing the soft magnetic film 2 from suffering oxidation and nitriding, and for example, $SiO_2$, SiN and the like can be used.

A thermosetting resin, an ultraviolet ray curable resin and an anaerobic curing resin, which contain an acrylic resin as a mother material, and the like can be used as the resin layer 4.

Such a material as aluminum, AlTi, AlCr and the like can be used as the reflecting layer 5. SiN, $SiO_2$ and the like can be used as the lower dielectric material layer 6 and the upper dielectric material layer 8.

While a magnetic film having a single layer (TbFeCo) may be used as the recording layer 7, in the case where a magnetic super resolution film having a three-layer structure is used, TbFeCo or DyFeCo can be used as a recording layer 71 formed on the lower dielectric material film 6, GdFeCo or GdFeCoSi can be used as an intermediate layer 72 thereon, and GdFeCo or GdFeCoCr can be used as a reproducing layer 73 thereon.

The cover layer 9 is for protecting the entire constitutional layers on the substrate. A transparent ultraviolet ray curable resin can be used therefor, and a thermosetting or anaerobic curing resin may also be used.

Characteristic Features of Constitution of First Example

The medium is that of the front illumination system, in which light is incident on the side of the cover layer 9 opposite to the substrate 1. In the invention, the protective film 3 is to prevent the soft magnetic film 2 from suffering oxidation and nitriding and to prevent the magnetic characteristics, particularly the magnetic permeability, of the soft magnetic film 2 from being deteriorated, and it is an essential element of the invention together with the soft magnetic film 2.

A servo pattern having a concavoconvex shape containing lands and grooves is formed on the surface of the resin layer 4. The reflecting film 5 and the recording film 7 formed on the resin film 4 also have a surface shape, which reflects the concavoconvex shape of the servo pattern, as shown in FIG. 1.

In order to maintain the distance between an objective lens or a coil and the medium to a constant length as short as possible, it is preferred to use a material having a rigidity as high as possible as the substrate. This is because a substrate having a low rigidity brings about large fluctuation in flying height of the flying head to cause a large aberration of the light beam spot, and thus, the performance in recordation and reproduction is deteriorated. In a substrate having a high rigidity, on the other hand, the fluctuation in flying height of the flying head is suppressed to cause small fluctuation in aberration of the light beam spot, whereby the signal quality can be prevented from being deteriorated.

In the case where the recording film 7 is formed of a magnetic super resolution film having a three-layer structure, information recorded in the recording layer 71 is transcribed to the reproducing layer 73 through the intermediate layer 72, and the information thus transcribed is reproduced through minute regions other than the masked regions of low temperatures and high temperatures formed on the reproducing layer 73 through irradiation of light.

The soft magnetic film 2 is formed to concentrate magnetic flux emitted from the coil to a area immediately below the coil as much as possible, and in order to prevent the recording layer 7 from being deteriorated, it is formed at a position under the resin layer 4 having the servo pattern formed thereon and in contact with the substrate 1.

Figure 2:
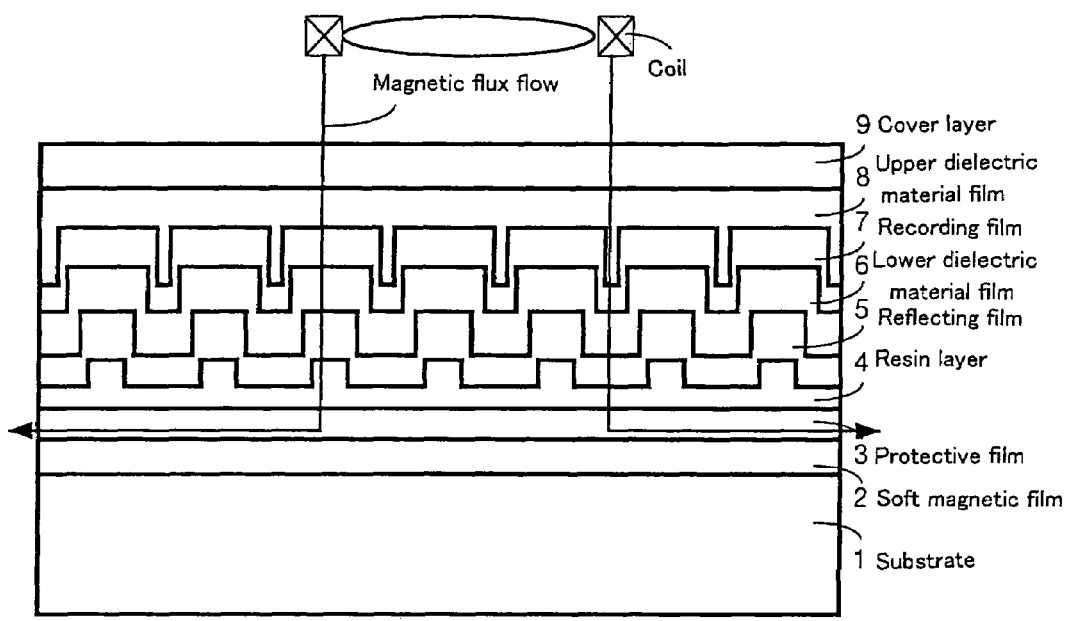
FIG. 2 is a schematic cross sectional view showing a function of a soft magnetic film of the first example of the invention.

In the case where the soft magnetic film 2 is present, it is considered that, as shown in FIG. 2, the magnetic flux propagated from the coil toward the medium reaches the soft magnetic film 2 as being concentrated to the area immediately below the coil, and is then horizontally propagated, whereby a magnetic field is effectively applied to the recording film 7. This can be understood by observing the recording magnetic filed dependency of the recording signal characteristics.

It is considered that the effect of magnetic field concentration of the soft magnetic film 2 is larger when the distance between the recording film 7 and the soft magnetic film 2 is as small as possible. Therefore, the total thickness of the protective film 3, the resin layer 4, the reflecting film 5 and the lower dielectric material film 6, which are provided between the recording film 7 and the soft magnetic film 2, is preferably as small as possible, and it is favorably about 10 μm or less. In other words, the distance between the soft magnetic film and the recording film is set at 10 μm or less.

Figure 3:
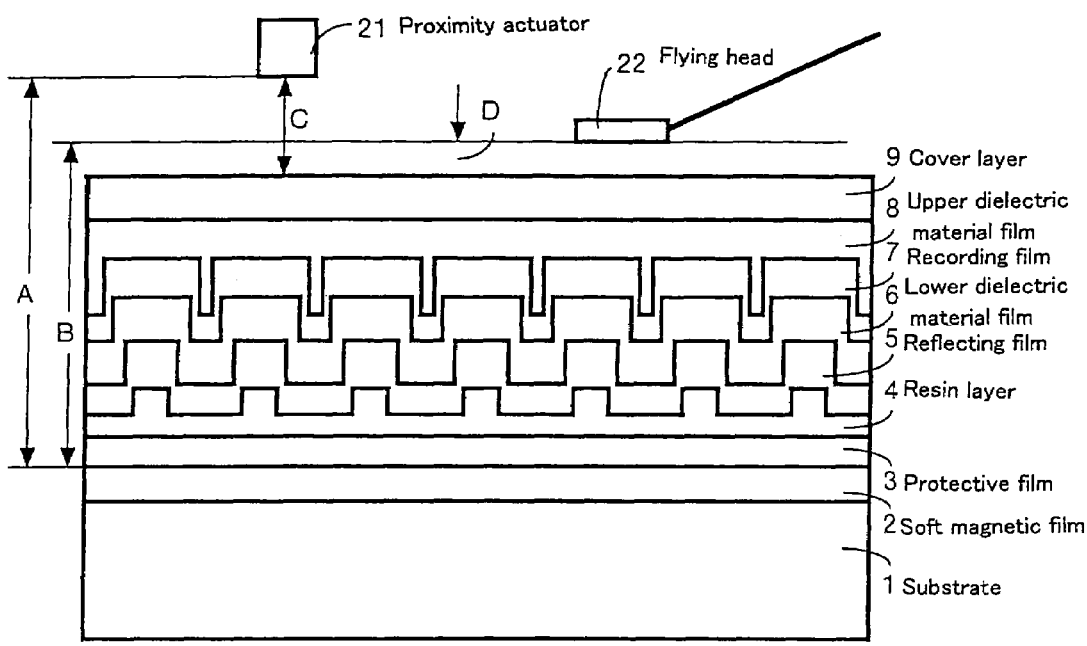
FIG. 3 is an explanatory view showing a positional relationship of a flying head and the like in the first example of the invention.

In the case using a proximity actuator 21, as shown in FIG. 3, when the distance C to the cover layer 9 is set at about 50 μm, the total thickness and the respective thicknesses of the constitutional layers including from the protective film 3 to the cover layer 9 are adjusted in such a manner that the distance A between a coil contained in the actuator 21 and the soft magnetic film 2 becomes about 70±4 μm.

In alternative, in the case using a flying head 22, as shown in FIG. 3, when the distance D to the cover layer 9 is set at about 1 μm, the total thickness and the respective thicknesses of the constitutional layers including from the protective film 3 to the cover layer 9 are adjusted in such a manner that the distance B between a coil contained in the flying head 22 and the soft magnetic film 2 becomes about 22±4 μm.

An anaerobic curing resin may be used as the resin layer 4 and the cover layer 9 as described in the foregoing. The anaerobic curing resin is cured by mixing an acrylic resin as a mother material with a polymerization initiator (primer) accelerating polymerization reaction at room temperature. For example, TB1390E may be used as the primer, and TB3062B may be used as the mother material resin.

Materials and Thicknesses of Constitutional Layers of First Example

Examples of the materials and the thicknesses of the constitutional layers of the magneto-optical recording medium of the first example of the invention will be described.

Figure 4:
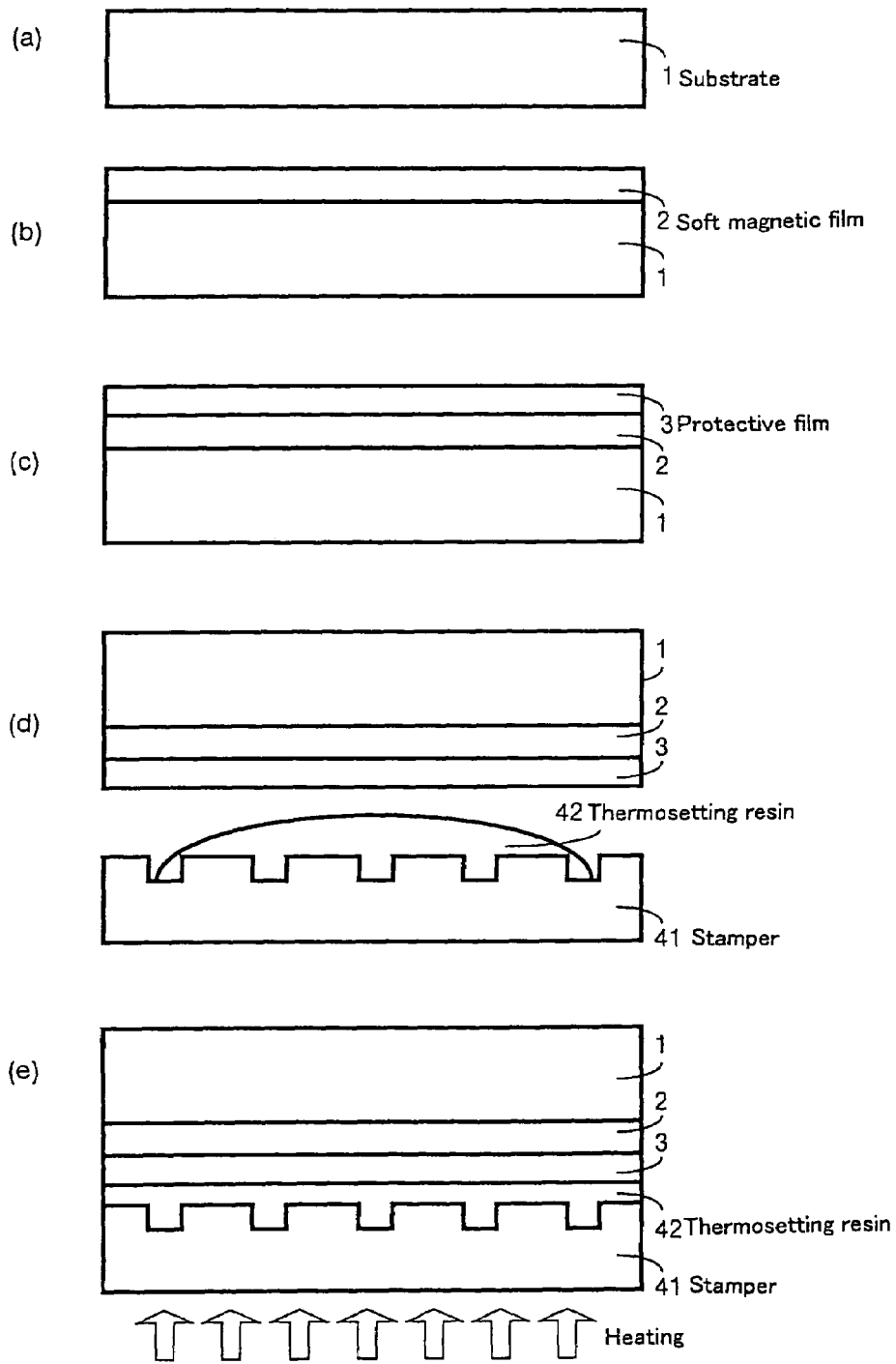
FIG. 4 is production process diagrams of the magneto-optical recording medium of the first example of the invention.
Figure 5:
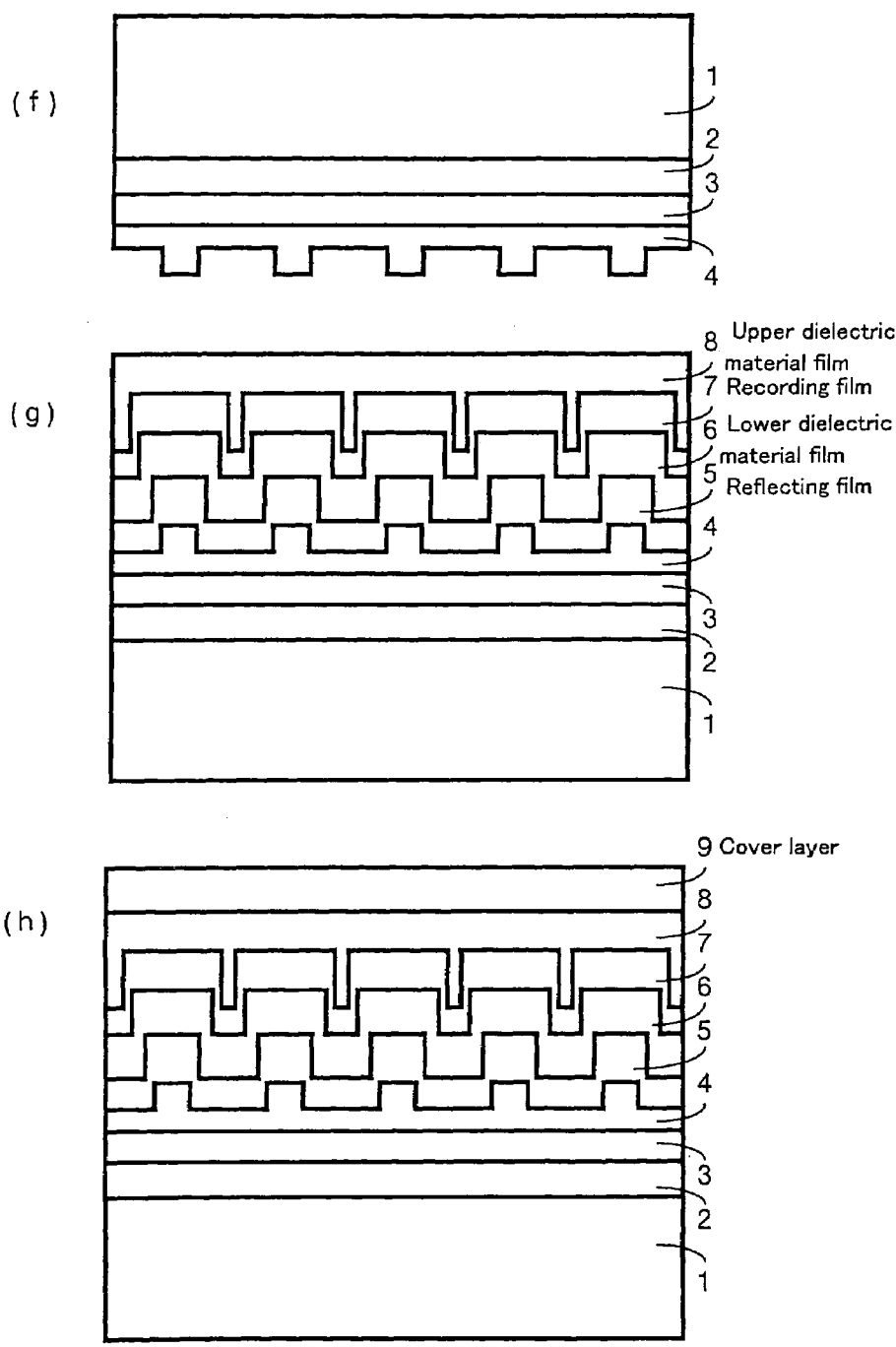
FIG. 5 is production process diagrams of the magneto-optical recording medium of the first example of the invention.

Substrate 1: glass (soda lime), thickness: 1.2 mm, surface roughness
Ra: 2.5 Å, diameter: 90 mm
Soft magnetic film 2: FeC, thickness: 100 nm, magnetic permeability: 900
Protective film 3: $SiO_2$, thickness 10 nm
Resin layer 4: thermosetting resin, thickness: 10 μm or less, depth of grooves of concavoconvex: 30 nm
Reflecting film 5: Al, thickness: 15 nm
Lower dielectric material film 6: SiN, thickness: 60 nm
Recording film 7: 130 nm (recording layer 71: TbFeCo 50 nm, intermediate layer 72: GdFeCo 40 nm, reproducing layer 73: GdFeCo 40 nm)
Upper dielectric material layer 8: SiN, thickness: 80 nm
Cover layer 9: ultraviolet ray curable resin, thickness: 10 μm Production Process of Medium of First Example Process diagrams of production of the magneto-optical recording medium of the first example of the invention are shown in FIGS. 4 and 5.

(1-1) Production of Glass Substrate 1

As shown in FIG. 4(a), a glass substrate 1 (plate thickness: 1.2 mm, diameter: 90 mm, surface roughness: 2.5 Å) is prepared.

(1-2) Formation of Soft Magnetic Film 2

As shown in FIG. 4(b), a film of FeC as a soft magnetic film 2 is formed on the substrate 1 to about 100 nm by a sputtering method. The sputtering is carried out by co-sputtering using an ordinary vacuum sputtering device while the substrate 1, an Fe target and a C target are placed at prescribed positions in the device. The film formation gas is Ar, the film formation gas pressure is 0.5 Pa, and the applied electric power is from 200 to 1,800 W.

For example, in the case where the compositional ratio is Fe 75% and C 25%, the applied electric power for the Fe target is 800 W, and the applied electric power for the C target is 800 W.

(1-3) Formation of Protective Film 3

As shown in FIG. 4(c), a film of $SiO_2$ as a protective film 3 for preventing oxidation and nitriding is formed on the soft magnetic film 2 to about 10 nm by a sputtering method.

The sputtering is carried out with a film formation gas pressure of from 0.5 to 1 Pa and an applied electric power of from 0.5 to 0.8 kW using a mixed gas of Ar and $O_2$ at a ratio of 2/1.

(1-4) Formation of Resin Layer 4

As shown in FIGS. 4(d), 4(e) and 5(f), a resin layer 4 having a servo pattern containing lands and grooves is formed on the protective film 3. In order to improve the adhesion between the protective film 3 and the resin layer 4, a silane coupling agent is first coated on the protective film 3.

A thermosetting resin 42 (acrylic resin) is then dropped on a stamper 41 (a nickel stamper, TP: 0.25 μm, groove depth: 30 nm) having a servo pattern formed thereon in such an amount that the resin penetrates into the entire grooves (about 0.15 g).

Before curing the resin, a member on the side of the substrate is pressed onto the stamper 41 with a prescribed pressure in such a manner that the servo pattern surface of the stamper 41 faces the protective film 3.

Subsequently, as shown in FIG. 4(e), after uniformly charging the resin between the stamper 41 and the protective film 3, heat (for example, at 140° C. for 30 minutes) is applied from the side of the stamper 41 for curing the resin.

After curing the resin, the thermosetting resin 42 is released from the stamper 41, and thus, as shown in FIG. 5(f), a medium having the resin layer 4 having the servo patter shape is produced.

High adhesion can be obtained between the protective film 3 and the resin layer 4 owing to the treatment of the protective film 3 with the silane coupling agent, and therefore, the resin layer 4 is released from the stamper 41. The resin layer 4 is formed to have a thickness of about 10 μm or less.

(1-5) Formation of Reflecting Film 5 and the Like

As shown in FIG. 5(g), a reflecting film 5 (Al film, thickness: 15 nm), a lower dielectric material film 6 (SiN, thickness: 60 nm), a recording film 7 (thickness: about 130 nm in total) and an upper dielectric material film 8 (SiN, thickness: 80 nm) are formed in this order on the resin layer 4.

All the films are formed by a sputtering method using Ar as a film formation gas at a gas pressure of from 0.5 to 1 Pa and an applied electric power of from 0.5 to 0.8 kw. In the formation of SiN, a mixed gas of Ar and $N_2$ at a ratio of 2/1 was used.

The recording film 7 is a magnetic super resolution film of a double mask RAD type having a three-layer structure (as shown, for example, in Japanese Unexamined Patent Application No. 2000-200448). In the reproduction principle of the magnetic super resolution film, magnetic masks are formed on a low temperature side and a high temperature side in a region irradiated with a laser spot, and a minute recording mark is reproduced through an intermediate temperature region between them.

In this example, the recording layer 71 (alloy film of Tb22.2Fe60.3Co17.5, thickness: 50 nm), the intermediate layer 72 (alloy film of $(Gd33.8Fe62.4Co3.8)_{92}Si_8$, thickness: 40 nm), and the reproducing layer 73 (alloy film of Gd24.6Fe61.8Co13.6, thickness: 40 nm) are formed in this order on the lower dielectric material film 6 by a sputtering method.

(1-6) Formation of Cover Layer 9

Finally, as shown in FIG. 5(h), a cover layer 9 (ultraviolet ray curable resin, thickness: about 10 μm±2 μm) is formed by coating an ultraviolet curable resin.

According to the aforementioned procedures, the magneto-optical recording medium of the first example (FIG. 1) of the invention is produced.

In the case where the distance C between the surface of the cover layer 9 and the proximity actuator 21 is 50 μm, and the distance D between the surface of the cover layer 9 and the flying head 22 is about 1 μm, as shown in FIG. 3, the distance A between the surface of the soft magnetic film 2 and the proximity actuator 21 can be about 70±4 μm, and the distance B between the soft magnetic film 2 and the flying head 22 can be about 22±4 μm, whereby the function of concentrating magnetic flux of the soft magnetic film 2 can be sufficiently exerted to provide a magneto-optical recording medium having stable magnetic characteristics with the soft magnetic film 2 not oxidized or nitrided.

Magnetic Characteristics of First Example

The fact that the medium of the first example of the invention provides sufficient CNR for recordation and reproduction even though a magnetic field of a lower level is applied thereto.

Two comparative examples, media A and B, are produced for comparison to the first example of the invention. The comparative example A has the same film constitution as in the first example shown in FIG. 1 except that the soft magnetic film 2 and the protective film 3 are omitted. The comparative example B has the same film constitution as in the first example shown in FIG. 1, but the thickness of the soft magnetic film 2 is changed to 50 nm. For comparing CNR of the three media, recordation is conducted with a magnetic field modulation system using an optical disk tester at a wavelength of 405 nm, NA of 0.85 and a beam spot diameter of 0.42 μm, at a linear velocity of 6.0 m/s and a shortest mark length of 0.2 μm, and CNR is measured with respect to the recording magnetic field intensity (Oe).

Figure 6:
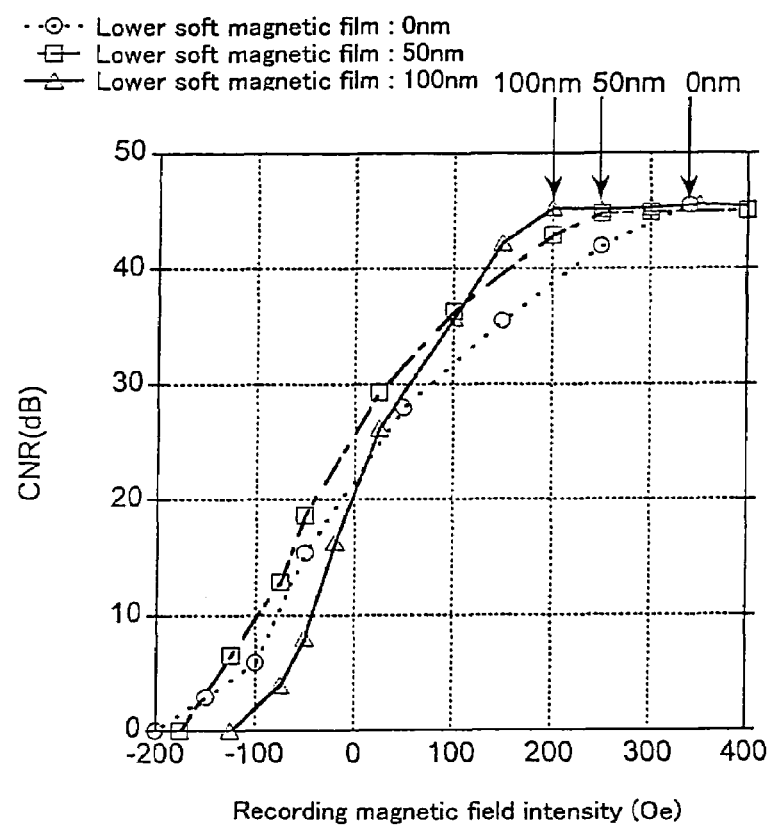
FIG. 6 is a graph showing a relationship between a recording magnetic field intensity and CNR of three magneto-optical recording media.

FIG. 6 is a graph showing the recording magnetic field intensity and the CNR of the three media.

In FIG. 6, the abscissa indicates the recording magnetic field intensity (Oe), and the ordinate indicates the CNR, signal-noise ratio (dB).

The solid line in the graph shows the medium of the first example, in which the CNR reaches the constant value and is saturated at a recording magnetic field intensity of about 200 Oe.

The broken line in the graph shows the medium of the comparative example A (having neither soft magnetic film nor protective film), in which the CNR is saturated at a recording magnetic filed intensity of about 340 Oe. The chained line in the graph shows the medium of the comparative example B (having the soft magnetic film 2 having a thickness of 50 nm), in which the CNR is saturated at about 250 Oe.

In general, the CNR is increased with increase of the recording magnetic field intensity, and in all the media, the CNR is saturated when the recording magnetic field intensity reaches a certain value.

The saturated CNR values thereof are all about 45 dB, and it is advantageous for improving the writing speed (i.e., recording speed) of the medium that the recording magnetic field intensity at the saturated CNR is as low as possible. As described in the foregoing, in order to realize a recording speed of 100 Mbps, it is necessary that the recording magnetic field intensity is at least suppressed to about 200 Oe or less.

According to the graph shown in FIG. 6, the medium of the first example of the invention attains saturated CNR at about 200 Oe, whereas the comparative examples A and B require application of a high recording magnetic field intensity of 250 and 340 Oe, respectively, and therefore, a recording speed of 100 Mbps cannot be realized with the media of the comparative examples.

In the conventional technique, sufficient recording characteristics (CNR: 45 dB) cannot be realized by applying a high recording magnetic field intensity of 300 Oe. In the medium of the first example of the invention, however, the equivalent recording characteristics (CNR) can be attained only by applying a lower recording magnetic field intensity of about 200 Oe, and a high recording speed of 100 Mbps can be realized owing to the low recording magnetic field intensity of 200 Oe applied. It is considered, as described in the foregoing, that this is because the medium of the first example of the invention is provided with the soft magnetic film 2 as an underlayer of the recording film 7 on the substrate, and is also provided with the protective film 3 for preventing the soft magnetic film 2 from being deteriorated, such as oxidation and the like, whereby the magnetic flux emitted from the coil is stably applied as concentrated to the area immediately below the coil.

SECOND EXAMPLE

The constitution and the production process of a magneto-optical recording medium of the second example of the invention will be described.

Figure 7:
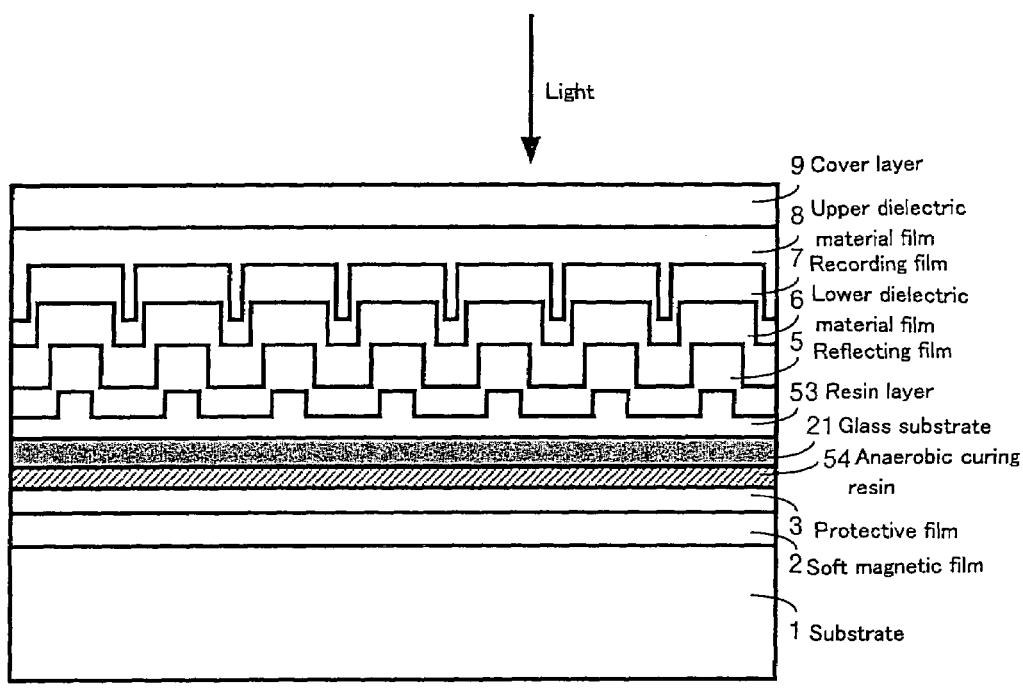
FIG. 7 is a schematic cross sectional view showing a magneto-optical recording medium of a second example of the invention.

FIG. 7 is a schematic cross sectional view showing a magneto-optical recording medium of the second example of the invention.

Constitution of Medium of Second Example

The magneto-optical recording medium of the second example has an accumulated structure obtained by forming a glass substrate 1, a soft magnetic film 2, a protective film 3, an anaerobic curing resin 54, a glass substrate 21, a resin layer 53, a reflecting film 5, a lower dielectric material film 6, a recording film 7, a protective film 8, and a cover layer 9 in this order.

In the second example, the medium is produced as being separated into two members until a certain step in the process, and the two members are combined to produce the medium. In FIG. 7, the glass substrate 21 is used for producing a member for forming the resin layer 53. The anaerobic curing resin 54 is for combining the second member constituted from the substrate 1, the soft magnetic film 2 and the protective film 3, and the first member constituted from the glass substrate 21 and the resin layer 53.

The glass substrate 21 may be a substrate having a high rigidity, and a silicon wafer may be used instead of glass. The aforementioned materials (primer: TB1390E, resin: TB3062B) can be used as the anaerobic curing resin 54.

The materials of the soft magnetic film 2 and the like may be the same as those in the first example.

Production Process of Medium of Second Example

Figure 8:
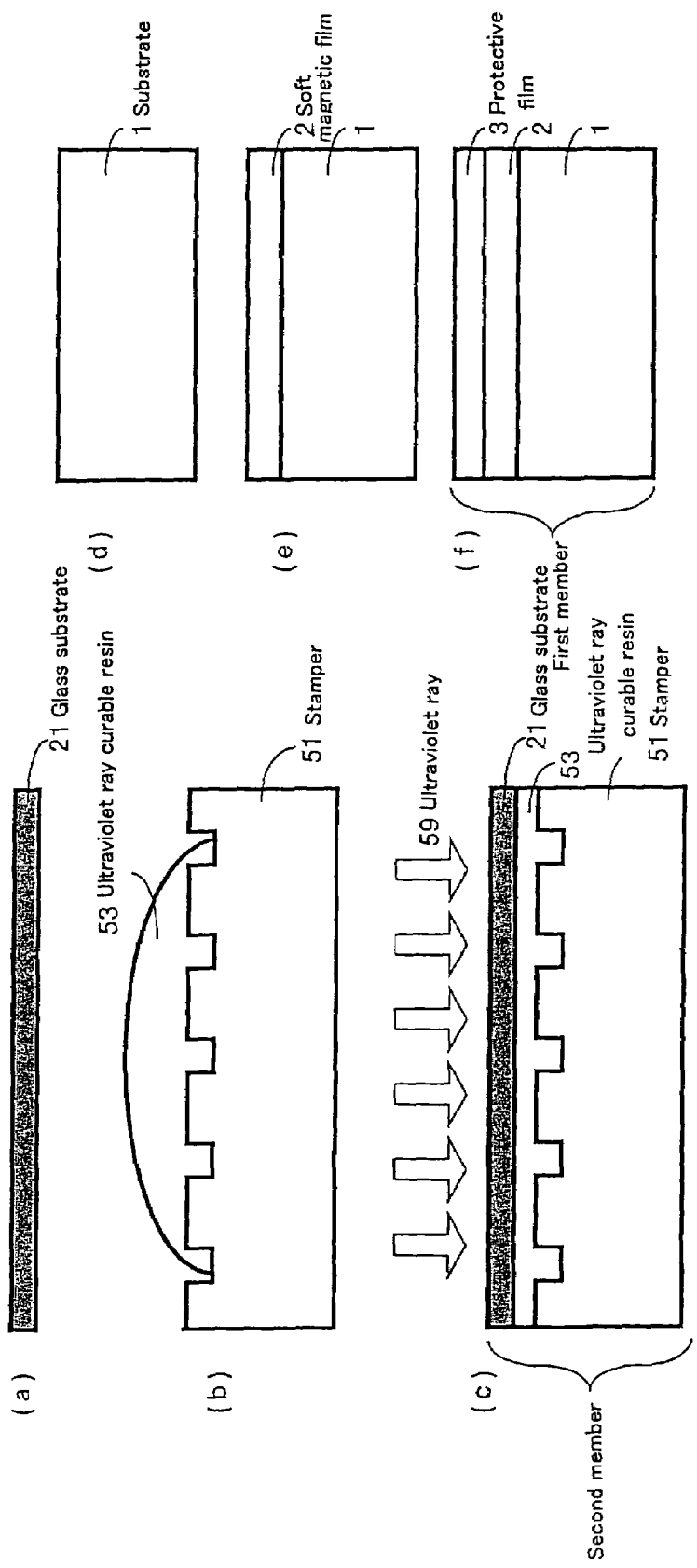
FIG. 8 is production process diagrams of the magneto-optical recording medium of the second example of the invention.
Figure 10:
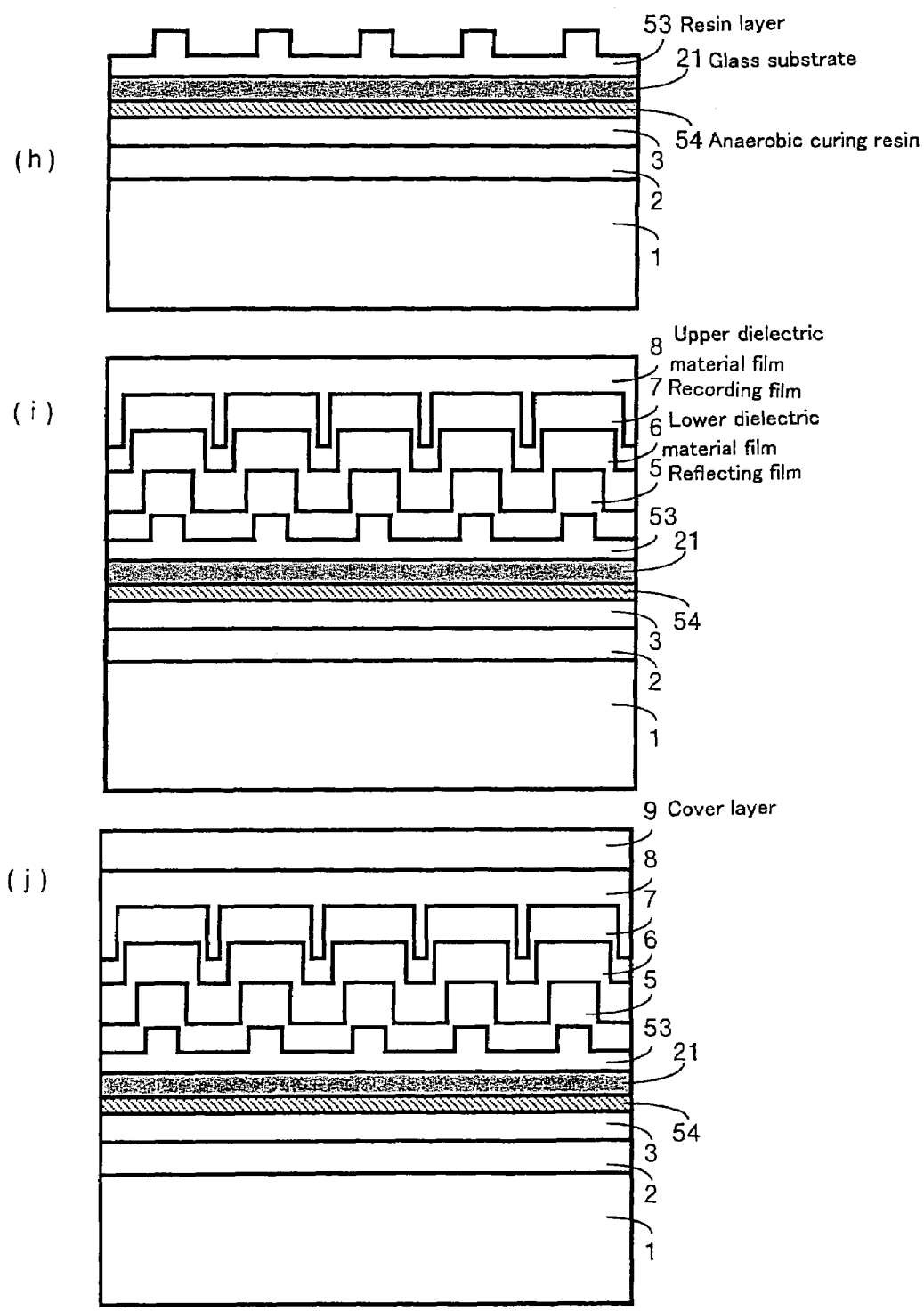
FIG. 10 is production process diagrams of the magneto-optical recording medium of the second example of the invention.

The medium of the second example is produced by a different process from that of the first example. Process diagrams of production of the second example are shown in FIGS. 8, 9 and 10.

(2-1) Production of Glass Substrate 21

As shown in FIG. 8(a), a glass substrate 21 (plate thickness: 100 μm, diameter: 90 mm, surface roughness: 2.5 Å) is prepared.

(2-2) Formation of Resin Layer 53

As shown in FIG. 8(b), 0.15 g of an ultraviolet curing resin 53 is dropped on a nickel stamper 51 having a servo pattern containing prescribed lands and grooves formed thereon (TP: 0.25 μm, groove depth: 30 nm). In order to ensure the adhesion, the surface of the glass substrate 21 that is to be in contact with the resin layer 53 is treated with a silane coupling agent.

The surface of the substrate 21 having been treated with the silane coupling agent is then placed on the ultraviolet curing resin 53 and pressed thereon, whereby the resin layer 53 is uniformly spread in the grooves. As shown in FIG. 8(c), an ultraviolet ray 59 is radiated (for 2 minutes) from the backside of the glass substrate 21 to cure the resin layer 53. The second member is thus completed through the aforementioned procedures.

(2-3) Production of First Member

As shown in FIG. 8(d), the same glass substrate 1 as in the first example is prepared. As shown in FIG. 8(e), a soft magnetic film 2 (FeC, thickness: 100 nm) is formed on the glass substrate 1 by a sputtering method. As shown in FIG. 8(f), a protective film 3 ($SiO_2$, thickness: 10 nm) is formed on the soft magnetic film 2 by a sputtering method. In order to ensure the adhesion in the next process step, the surface of the protective film 3 is treated with a silane coupling agent. The first member is thus completed through the aforementioned procedures.

(2-4) Combining of First and Second Members

As shown in FIG. 9(g), the glass substrate 21 of the second member and the protective film 3 of the first member are adhered through an anaerobic curing resin 54. The aforementioned material obtained by mixing a primer and a resin is used as the anaerobic curing resin 54, and the resin 54 is dropped on the surface of the glass substrate 21 in such an amount that provides a thickness of about 10 μm after curing the resin 54.

As shown in FIG. 9(h), after curing the anaerobic resin 54, the stamper 51 is released from the resin layer 53. A combined medium having the servo pattern formed on the surface thereof is obtained through the aforementioned procedures.

(2-5) Formation of Reflecting Film 5, Lower Dielectric Material Film 6, Recording Film 7 and Upper Dielectric Material Film 8

On the resin layer 53 having the servo pattern formed thereon as shown in FIG. 10(h), a reflecting film 5, a lower dielectric material film 6, a recording film 7 having the three-layer structure, and an upper dielectric material film 8 are formed in this order in the same manner as in the first example (FIG. 10(i)). The film formation conditions, such as thicknesses, the materials and the like, may be the same as those in the first example.

(2-9) Formation of Cover Layer 9

Finally, as shown in FIG. 10(j), a cover layer 9 (ultraviolet ray curable resin, thickness: about 10 μm, ±2 μm) is formed by coating an ultraviolet curable resin, so as to complete the magneto-optical recording medium of the second example of the invention.

Figure 11:
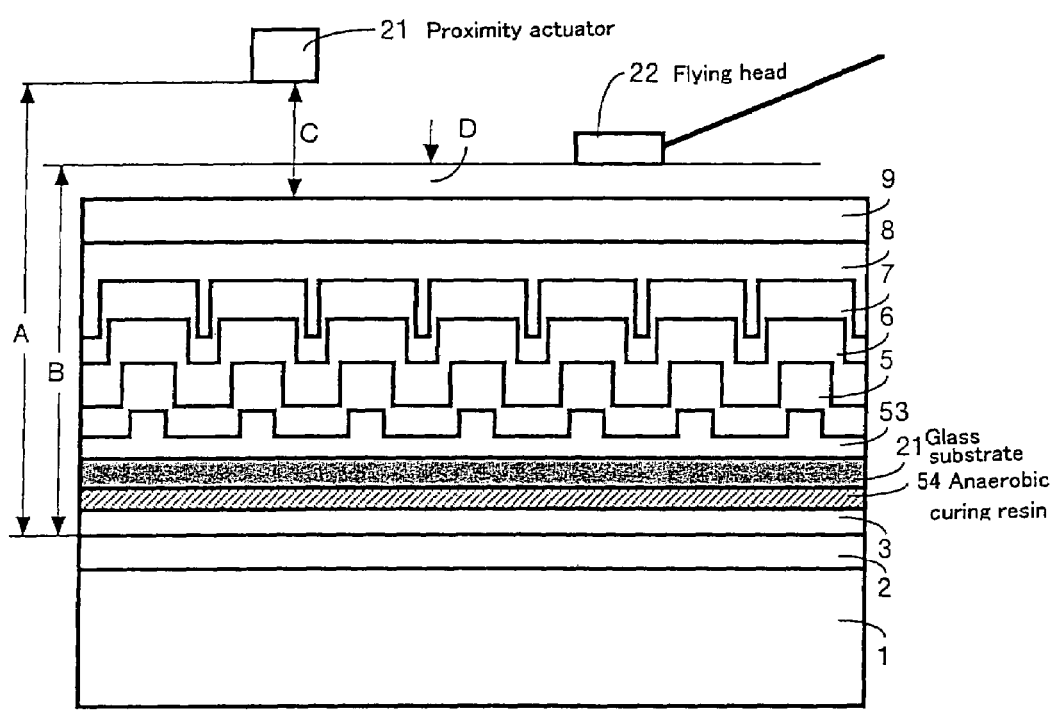
FIG. 11 is an explanatory view showing a positional relationship of a flying head and the like in the second example of the invention.

FIG. 11 is an explanatory view showing the positional relationship of a proximity actuator or a flying head in the second example of the invention.

As similar to FIG. 3, in the case where the distance C between the surface of the cover layer 9 and the proximity actuator 21 is 50 μm, and the distance D between the surface of the cover layer 9 and the flying head 22 is about 1 μm, the distance A between the surface of the soft magnetic film 2 and the proximity actuator 21 can be about from 175 to 185 μm, and the distance B between the soft magnetic film 2 and the flying head 22 can be about from 126 to 136 μm.

In this case, the magnetic flux can be stably concentrated owing to the formation of the soft magnetic film 2 and the protective film 3 on the substrate 1, whereby sufficient CNR for recordation and reproduction is obtained to realize high speed recording of about 100 Mbps even though a low recording magnetic field intensity of about 200 Oe is applied thereto.

THIRD EXAMPLE

While the glass substrate 21 is used in the second member in the second example, a second member having no glass substrate 21 may be combined with the first member.

In the third example, the ultraviolet ray curing resin 53 of the second member and the protective film 3 of the first member are combined through an anaerobic curing resin 54.

Therefore, the distance between the soft magnetic film 2 and the recording film 7 can be shortened owing to the absence of the glass substrate 21 in such a thickness that corresponds thereto (about 1.2 mm), whereby further stable magnetic flux concentration and sufficient CNR can be obtained in comparison to the second example to realize high speed recording of about 100 Mbps with application of a low recording magnetic field intensity of about 200 Oe.

Figure 12:
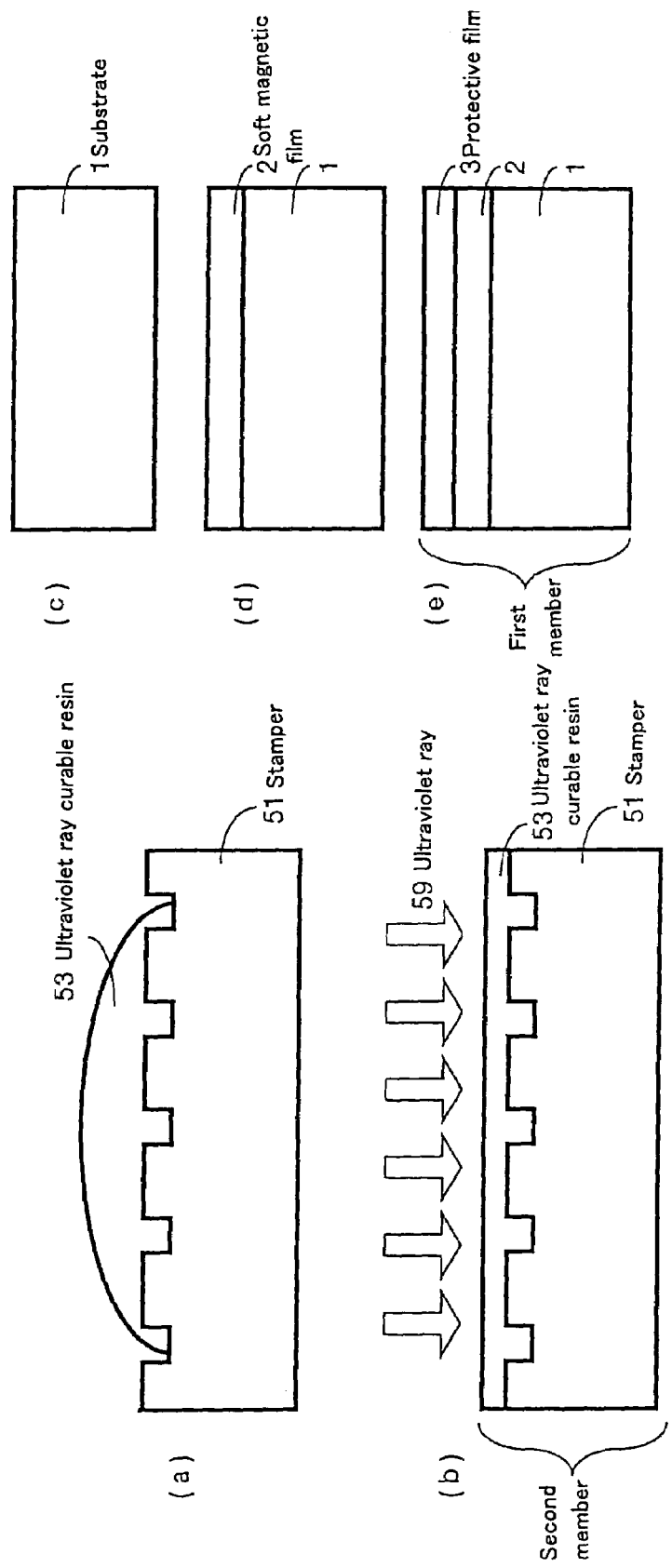
FIG. 12 is production process diagrams of the magneto-optical recording medium of a third example of the invention.
Figure 14:
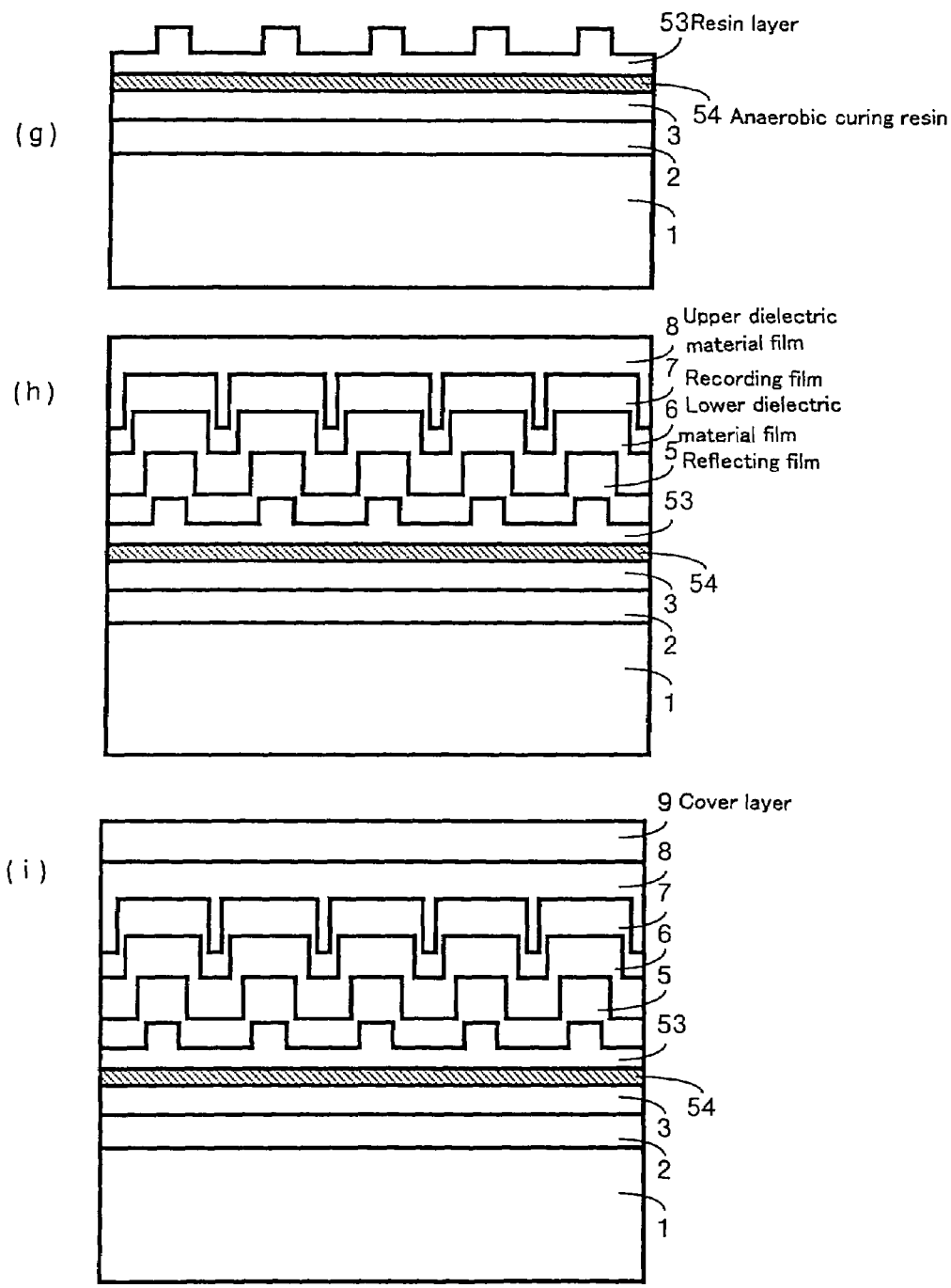
FIG. 14 is production process diagrams of the magneto-optical recording medium of the third example of the invention.

Process diagrams of production of the magneto-optical recording medium of the third example of the invention are shown in FIGS. 12, 13 and 14.

(3-1) Production of Second Member

As shown in FIG. 12(a), 0.9 g of an ultraviolet curing resin 53 is dropped on the same nickel stamper 51 as in the second example.

The stamper 51 is spun at a rate of about 2,000 rpm to spin-coat the ultraviolet curing resin 53 for covering the entire concavoconvex on the surface of the stamper.

As shown in FIG. 12(b), the resin 53 is then irradiated with an ultraviolet ray 59 for curing. A resin film 53 having a thickness of about 10 μm is thus formed through the procedures.

The second member is thus completed through the aforementioned procedures.

(3-2) Production of First Member

The first member is completed through the process steps shown in FIGS. 12(c), (d) and (e) (formation of a soft magnetic film 2 and a protective film 3) in the same manner as in the second member of the second example.

(3-3) Combining of First and Second Members

As shown in FIG. 13(f), a prescribed amount of an anaerobic curing resin 54 is dropped on the resin layer 53 thus cured, and the resin layer 53 of the second member and the protective film 3 of the first member are adhered.

As shown in FIG. 13(g), after curing the anaerobic curing resin 54, the stamper 51 is released from the resin layer 53. A combined medium having the servo pattern formed on the surface thereof is obtained through the aforementioned procedures.

(3-4) Formation of Reflecting Layer 5 to Cover Layer 9

On the resin layer 53 of the combined medium shown in FIG. 14(g), a reflecting film 5, a lower dielectric material film 6, a recording film 7, an upper dielectric material film 8 and a cover layer 9 are formed in the same manner as in the first and second examples (FIGS. 14(h) and (i)).

The magneto-optical recording medium of the third example of the invention is thus completed through the aforementioned procedures.

While the three constitutions and production processes thereof have been described as the magneto-optical recording medium according to the invention, the constitution of from the lower dielectric material film 6 to the cover layer 9 is not particularly limited to these constitutions, but those having been applied to the conventionally used magneto-optical recording media may be applied.

In particular, the recording film 7 may be a recording magnetic film having a single layer structure instead of the magnetic super resolution film having the three-layer structure.

ADVANTAGE OF THE INVENTION

In the invention, the protective film is formed in contact with the soft magnetic film, the soft magnetic can be prevented from suffering oxidation and nitriding to provide a magneto-optical recording medium having stable magnetic characteristics.

The soft magnetic film is disposed in contact with the substrate, on which the protective film and the resin layer having a servo pattern formed thereon are formed, and the recording layer is formed further thereon, whereby magnetic flux emitted from a coil of a flying head or the like can be applied as being concentrated to the area immediately below the coil, so as to provide a medium with stable magnetic characteristics having sufficient recordation and reproduction characteristics even with application of a magnetic field smaller than that of the conventional technique.

The electric current applied to the coil can be reduced owing to the small magnetic field applied, whereby the recording speed can be increased to about 100 Mbps.

The invention claimed is:

1. A magneto-optical recording medium comprising at least a soft magnetic layer, a protective layer, a resin layer having a servo pattern formed thereon, a reflecting film, a lower dielectric material film, a recording film, an upper dielectric material film, and a cover layer, formed on a substrate in this order, the protective layer being coated with a silane coupling agent and preventing changes to magnetic characteristics of the soft magnetic layer, and the resin layer being formed on the protective film coated with the silane coupling agent.

2. A magneto-optical recording medium as in claim 1, characterized in that the soft magnetic film is formed with FeC.

3. A magneto-optical recording medium as in claim 1 or 2, characterized in that thicknesses of the resin layer, the reflecting film and the lower dielectric material film are adjusted to regulate a distance between the soft magnetic film and the recording film to about 10 μm or less.

4. A magneto-optical recording medium as in claim 1, characterized in that thicknesses of the respective constitutional films including from the protective film to the cover layer are adjusted to maintain a distance between the soft magnetic film and a coil for generating a magnetic field provided in a recordation and reproduction head to about 22±4μm.

5. A magneto-optical recording medium comprising a first member comprising a soft magnetic film and a protective film formed on a first substrate in this order, and a second member comprising a resin layer having a servo pattern formed thereon, a reflecting film, a lower dielectric material film, a recording film, an upper dielectric material film, and a cover layer, formed on a second substrate having light transmissibility, the protective film and the second substrate being adhered through an anaerobic curing resin, the protective layer being coated with a silane coupling agent and preventing changes to magnetic characteristics of the soft magnetic layers and the resin layer being formed on the protective film coated with the silane coupling agent.

6. A magneto-optical recording medium as in claim 5, characterized in that the soft magnetic film is formed with FeC.

7. A magneto-optical recording medium as in claim 5 or 6, characterized in that thicknesses of the resin layer, the reflecting film and the lower dielectric material film are adjusted to regulate a distance between the soft magnetic film and the recording film to about 10 μm or less.

8. A magneto-optical recording medium as in claim 5, characterized in that thicknesses of the respective constitutional films including from the protective film to the cover layer are adjusted to maintain a distance between the soft magnetic film and a coil for generating a magnetic field provided in a recordation and reproduction head to about 22±4 mm.

* * * * *